United States Patent [19]

Evans, Jr. et al.

[11] Patent Number: 5,078,478
[45] Date of Patent: Jan. 7, 1992

[54] LIGHT ACTUATED OPTICAL SWITCHING DEVICE

[75] Inventors: Joseph T. Evans, Jr.; Jeff A. Bullington, both of Albuquerque, N. Mex.

[73] Assignee: Radiant Technologies, Inc., Albuquerque, N. Mex.

[21] Appl. No.: 523,471

[22] Filed: May 14, 1990

[51] Int. Cl.$^5$ .................. G02B 5/23; G02B 6/10; G02F 1/01
[52] U.S. Cl. .......................... 359/299; 385/5
[58] Field of Search ............ 350/353, 355, 356, 96.13, 350/96.14, 354

[56] References Cited

U.S. PATENT DOCUMENTS

| | | | |
|---|---|---|---|
| 4,002,898 | 1/1977 | Milton | 350/96.14 |
| 4,119,929 | 10/1978 | Shackleford et al. | 350/356 |
| 4,343,536 | 8/1982 | Watanabe et al. | 350/355 |
| 4,391,901 | 7/1983 | Land et al. | 350/356 |
| 4,715,680 | 12/1987 | Kawaguchi et al. | 350/96.34 |
| 4,759,595 | 7/1988 | Boord et al. | 350/96.14 |
| 4,867,543 | 9/1989 | Bennion et al. | 350/356 |
| 4,902,087 | 2/1990 | Lins et al. | 350/96.13 |
| 4,929,063 | 5/1990 | Durand et al. | 350/353 |
| 4,986,639 | 1/1991 | Chang et al. | 350/355 |
| 5,013,114 | 5/1991 | Young | 350/96.14 |

FOREIGN PATENT DOCUMENTS

| | | | |
|---|---|---|---|
| 62-299937 | 12/1987 | Japan | 350/355 |
| 63-189839 | 8/1988 | Japan | 350/355 |
| 2-166423 | 9/1990 | Japan | 350/354 |

Primary Examiner—Rolf Hille
Assistant Examiner—Mahshid Saadat
Attorney, Agent, or Firm—McCubbrey, Bartels, Meyer & Ward

[57] ABSTRACT

A light activated switching device is disclosed in which the receipt of a light signal is used to switch a light beam between two output ports. The input light beam is reflected from an interface between two regions having different indices of refraction when the light signal is present. The reflected light beam then exits through the first output port. In the absence of the light signal, the two regions have the same index of refraction, and the light beam passes through both regions and exits through the second output port.

11 Claims, 3 Drawing Sheets

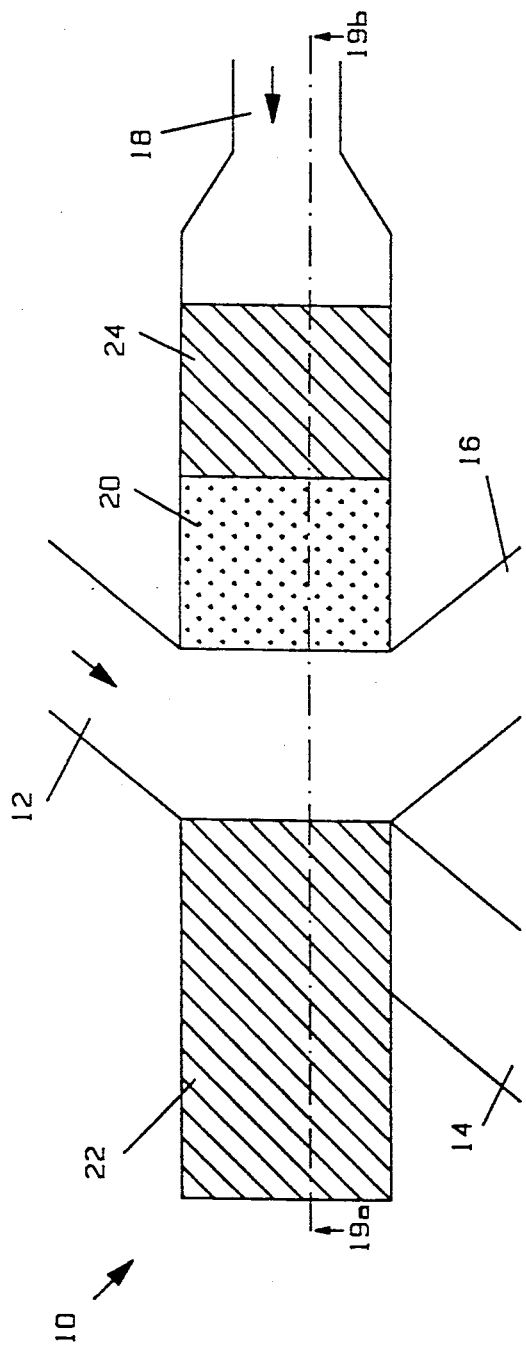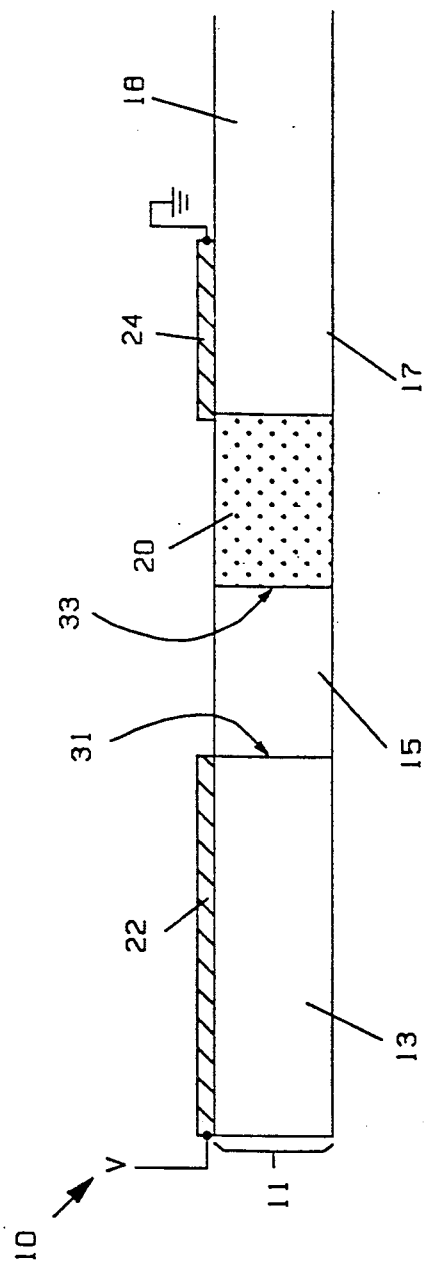

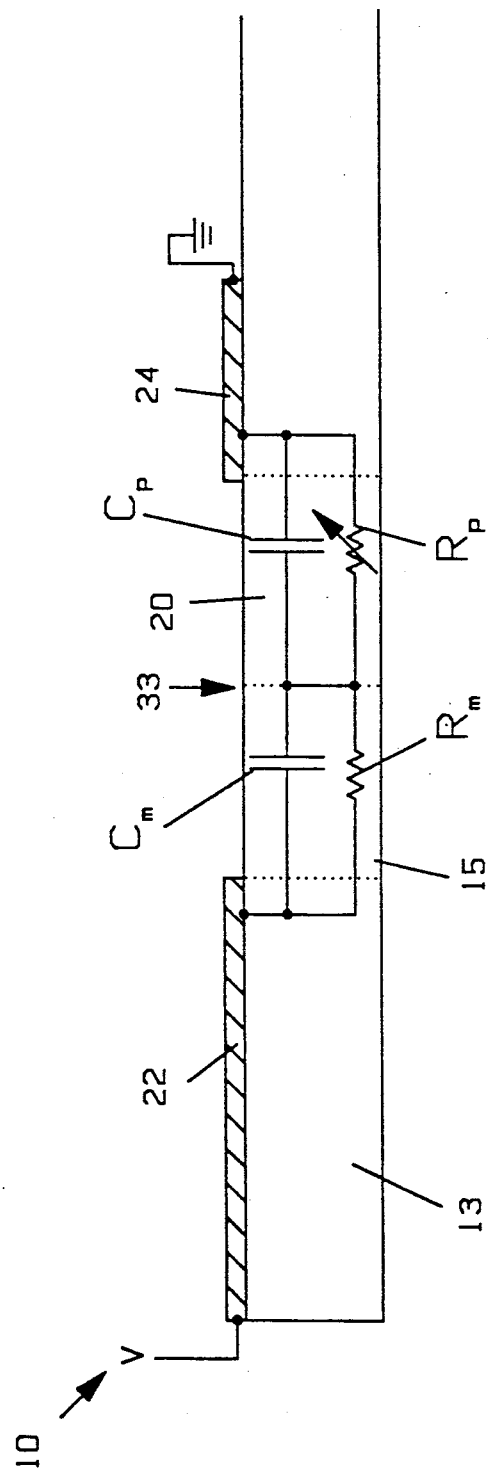

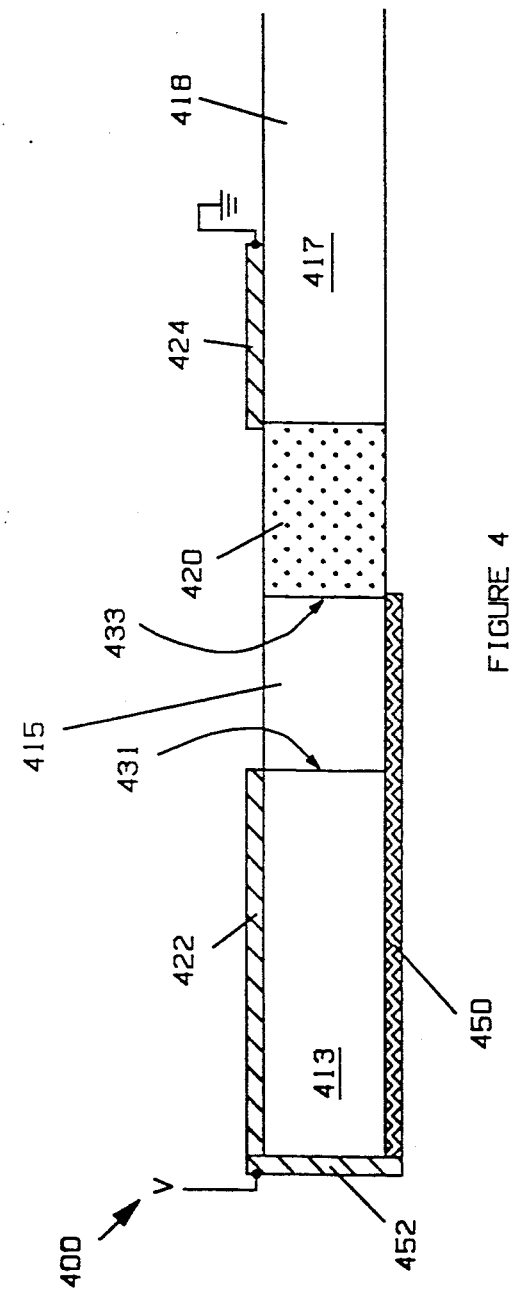
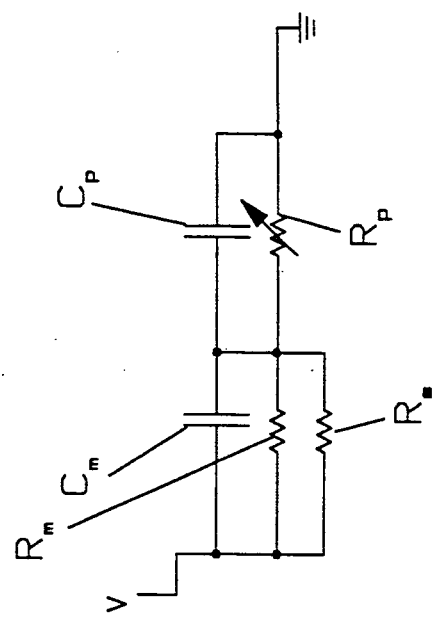
FIGURE 4
FIGURE 5

LIGHT ACTUATED OPTICAL SWITCHING DEVICE

BACKGROUND OF THE INVENTION

The present invention relates to devices for switching light beams between predefined channels and more particularly to a light actuated switching device.

Communication and computational systems utilizing switched light beams have the potential of providing substantial improvements in telephone and computer systems. Fiber optic transmission lines are already being utilized to increase the capacity of telephone systems. Computing devices based on switching light beams hold the promise of dramatic increases in the capacity and speed of computers.

Unfortunately, the maximum speed with which current light switching equipment operates is still limited by the speed with which electrical signals can be turned on and off. For example, optical fiber communication systems still utilize electrical components to switch the laser beams on and off to generate the light pulses at the transmission end of an optical fiber. In addition, such systems utilize light detectors and electrical circuit elements at the receiving end of the fiber to decode the information transmitted on the fiber.

Optical fibers are capable of carrying hundreds of billions of light pulses per second. However, economical electrical circuitry which is capable of differentiating such closely spaced light pulses is not known to the art. As a result, fiber optic communication systems typically operate at a few hundreds of MHz.

In principle, successive light pulses in the optical fiber could be routed to different detectors to reduce the load on any individual detector. Devices for routing a light beam between one of two paths are well known to the optical arts. Such devices utilize an electric field to alter the index of refraction of a medium through which the light beam passes. In its simplest form, such a device has two indices of refraction, corresponding to two electric field states. In one of the states, the light exits the medium through a first port. Light is switched to a second port by applying the appropriate electric field to the medium. The electric field alters the index of refraction of the medium which results in the light being reflected from an interface between two regions having different indices of refraction.

To switch the light between the ports, a voltage must be switched between electrodes on the surface of the medium in question. Hence, the light beam can not be switched faster than the voltage in question is switched. Therefore, such devices have been limited by the speed at which electrical components can switch voltages.

Broadly, it is an object of the present invention to provide an improved light switching device.

It is a further object of the present invention to provide a light switching device which is not limited by the speed at which electrical signals can be switched.

These and other objects of the present invention will become apparent to those skilled in the art from the following detailed description of the invention and the accompanying drawings.

BRIEF DESCRIPTION OF THE DRAWINGS

FIG. 1 is a top view of a light switching device according to the present invention.

FIG. 2 is a cross-sectional view of the light switching device shown in FIG. 1.

FIG. 3 is an equivalent circuit for the light switching device shown in FIG. 1.

FIG. 4 is a cross-sectional view of an alternative embodiment of a light switching device according to the present invention.

FIG. 5 is an equivalent circuit for the light switching device shown in FIG. 4.

SUMMARY OF THE INVENTION

The present invention comprises an optically activated light switching device. The switching device includes a transparent region having a predefined boundary and a modulation region having first and second boundaries. The first boundary of the modulation region is coincident with the boundary of the transparent region. The modulation region has first and second indices of refraction. The first index of refraction is substantially equal to that of the transparent region. The index of refraction of the modulation region is switched between the first and second indices by the generation of an electric field in said modulation region. The switching device includes an input port for receiving light and directing the light toward the first boundary of the modulation region at a predetermined angle with respect to the boundary. The device also includes a first output port for receiving the light input to the input port means when the modulation region has said first index of refraction. The device further includes a control port for receiving a light signal having a wavelength less than a predetermined wavelength and a field generating means for generating a potential difference between said first and second boundaries of said modulation region in response to said control port means receiving said light signal.

One embodiment of the present invention includes a second output port positioned for receiving the light input to the input port when said light is reflected from said first boundary of said modulation region.

DETAILED DESCRIPTION OF THE INVENTION

The present invention may be most easily understood with reference to FIGS. 1 and 2. FIG. 1 is a top view of a light switching device 10 according to the present invention. FIG. 2 is a cross-sectional view of light switching device 10 taken through line 19a–19b. Light switching device 10 accepts light through an input light pipe 12 and transmits that light either through output light pipe 14 or output light pipe 16. If no light is input to control light pipe 18, the light from input light pipe 12 exits through output light pipe 14. However, if light having a wavelength less than a predetermined wavelength is input to control light pipe 18, the light from input light pipe 12 exits through output light pipe 16.

Light switching device 10 is preferably constructed from a thin optically transparent layer 11 of paraelectric material. The manner in which this layer is deposited and processed will be discussed in more detail below. For the purpose of the present discussion, it is sufficient to note that layer 11 is divided into four regions, 13, 15, 20, and 17. Region 13 is a portion of layer 11 which underlies an electrode 22. Adjacent thereto is region 15. The interface between regions 13 and 15 is shown in FIG. 2 at 31. When no light is input to control light pipe 18, regions 13 and 15 have the same index of refraction. For reasons that will become apparent from the following discussion, region 15 will be referred to as the modulation region.

Adjacent to modulation region 15 is the third region which will be referred to in the following discussion as photoconductive region 20. Photoconductive region 20 is preferably constructed by ion implantation of thin film 11. The details of the ion implantation will be discussed in more detail below. For the purposes of the present discussion, it is sufficient to note that photoconductive region 20 is essentially an electrical insulator in the absence of illumination. When illuminated with light, photoconductive region 20 becomes an electric conductor. The light in question is the light input through control light pipe 18. The boundary between photoconductive region 20 and modulation region 15 is shown at 33 in FIG. 2.

The fourth region 17 underlies a second electrode 24 and connects photoconductive region 20 to control light pipe 18.

A constant potential difference of V is generated between electrodes 22 and 24 by connection to suitable potential sources. For the purposes of this discussion, it will be assumed that electrode 22 is connected to a potential V, and electrode 24 is connected to ground. However, it will be apparent to those skilled in the art that other choices of potentials will also function adequately.

Light switching device 10 switches the light input through light pipe 12 to output light pipe 16 by altering the index of refraction of modulation region 15. When modulation region 15 has a sufficiently different index of refraction from region 13, the boundary at interface 31 will reflect light incident thereon. If the angle of incidence of the light is sufficiently shallow with respect to interface 31, the light will be totally reflected from boundary 31. The angles in question will be discussed in more detail below.

As noted above, region 13 and modulation region 15 are preferably constructed from a thin film of paraelectric material. In the absence of an electric field in modulation region 15, it will have the same index of refraction as region 13. Hence, no boundary will exist between the two regions. As a result, light entering light pipe 12 will traverse modulation region 15 and region 13 and then exit through output light pipe 14.

The manner in which an electric field is generated in modulation region 15 in response to light being input through control light pipe 18 will now be explained with the aid of FIG. 3. FIG. 3 is an equivalent circuit for light switching device 10. Modulation region 15 is electrically equivalent to the parallel combination of capacitor $C_m$ and resistor $R_m$. In the preferred embodiment of the present invention, $R_m$ is typically $10^{10}$ ohms. Capacitor $C_m$ is the capacitance between electrode 22 and interface 33.

Photoconductive region 20 is electrically equivalent to the parallel combination of capacitor $C_p$ and variable resistor $R_p$. $C_p$ is the capacitance between interface 33 and electrode 24. In the absence of light, $R_p$ is very large. As will be discussed below in more detail, in the preferred embodiment of the present invention, $R_p$ is typically $10^{14}$ ohms. In the presence of light, $R_p$ is typically a few hundred ohms.

The manner in which the change in value of $R_p$ is utilized in the present invention to switch the index of refraction of modulation region 15 is most easily understood by considering the steady state voltage at interface 33. In the presence of light, $R_p$ is much smaller than $R_m$. In this case, interface 33 will be essentially at ground. As a result, the voltage drop across modulation region 15 will be V. That is, there will be a substantially constant electric field in modulation region 15. As noted above, modulation region 15 preferably comprises a paraelectric material. As will be appreciated by those skilled in the art, the index of refraction of a paraelectric changes in response to an electric field being generated therein. Hence, when light is present in photoconductive region 20, an electric field will be present in modulation region 15, hence causing a change in its index of refraction. However, no such field will be present in region 13. Hence interface 31 shown in FIG. 2 will separate regions of differing indices of refraction.

When no light is incident on photoconductive region 20, $R_p$ is much larger than $R_m$. In this case, the potential at interface 33 will be substantially equal to V, the same potential as electrode 22. Thus, there will be substantially no potential difference between electrode 22 and interface 33. As a result, the electric field in modulation region 15 will be substantially equal to that in region 13. Since region 13 and modulation region 15 are constructed from the same material, the interface 31 will be absent.

As noted above, $R_m$ and $R_p$, when no light is present in photoconductive region 20, are quite large. It is an object of the present invention to construct a light switching device that switches quickly. The transient response of light switching device 10 depends on $C_m$ and $C_p$. As will now be explained in detail, the preferred embodiment of the present invention is constructed such that $C_m$ is much larger than $C_p$.

Consider the case in which light is present in photoconductive region 20 and then suddenly turned off. Just before the light is turned off, the potential at interface 33 is substantially equal to ground. Just after the light is turned off, insufficient time will have elapsed for current to flow through $R_m$ to charge $C_p$. Hence, the circuit will appear to be a simple pair of series connected capacitors. Thus potential of V will appear across the series combination of $C_m$ and $C_p$. To obtain fast switching, the potential at interface 33 must jump to V. This will be the case if $C_m$ is much larger than $C_p$. In the preferred embodiment of the present invention, this is accomplished by altering the dielectric constant of photoconductive region 20. As will be explained in more detail below, the dielectric constant of photoconductive region 20 can be reduced by ion bombardment of said region.

In the case in which photoconductive region 20 is suddenly exposed to light after being in the dark, there is no capacitive charging problem. In this case, interface 33 is directly connected to ground through resistor $R_p$ which is only of the order of 1000 ohms when photoconductive region 20 is exposed to light. As long as $RC_p$ is small compared to the rise time of the light pulse incident through control light pipe 18, light switching device 10 will switch in a time comparable to the rise time of said light pulse. Here, R is the value of $R_p$ in the presence of light.

An alternative embodiment of the present invention is shown in FIG. 4 at 400. This embodiment utilizes a pull-up resistor to improve the switching speed after the light at the control port is turned off. FIG. 4 is a cross-sectional view of switching device 400. Switching device 400 differs only in the addition of a resistive layer 450 which is connected to the electrode that is connected to V by a conductive layer 452. Resistive layer

450 may be constructed by depositing a thin film of $SnO_2$ or $InSnO_2$ on the substrate on which switching device 400 is constructed.

The other elements of switching device 400 are analogous to those shown in FIG. 1; hence they are labeled with like numbers. Resistive layer 450 provides a resistive connection between interface 433 and electrode 422. The resistance of resistive layer 450 is denoted by $R_s$.

An equivalent circuit for switching device 400 is shown in FIG. 5. $R_s$ is chosen to be much smaller than $R_m$. However, it is also much greater than $R_p$ when light is present on photoconductive region 420. When photoconductive region 420 is illuminated, interface 433 will again be at a potential substantially equal to GND. When the light is removed from photoconductive region 420, interface 433 will change to a potential of V with a time constant equal to $R_sC_p$. Hence, including resistive layer 450 allows a shorter switching time independent of the relationship between $C_p$ and $C_m$.

In the preferred embodiment of the present invention, regions 13, 15, 20, and 17 are constructed from a thin film of paraelectric or ferroelectric material which is deposited on the surface of a suitable substrate. The material in question is preferably a lead lanthanum zirconate titanate (PLZT). By adjusting the composition of the constituents, the material can be caused to be either paraelectric or ferroelectric. The film is typically a structure of the form $ABO_3$ where the A site may be filled with either lead or lanthanum and the B site may be filled with either zirconium or titanium. A paraelectric film may be obtained by adjusting the composition of the A site to 91% lead and 9% lanthanum and the B site to 65% zirconium and 35% titanium. A ferroelectric film may be obtained by omitting the lanthanum from the A site and adjusting the composition of the B site to 60% zirconium and 40% titanium. Other compositions will be apparent to those skilled in the art.

The material may be deposited on the substrate using sputtering, chemical vapor deposition, or sol gel deposition. The preferred method of deposition is the conventional sol gel deposition technique. In this technique, a solution of the PLZT material is spun onto the substrate. The solution consists of a solvent carrying a metal organic complex which has been partially jelled into long chains. The chains consist of a linear array of metal atoms alternating with oxygen atoms and coordinated with hydrocarbon groups along the outside of the linear array. The chains are normally formed by hydrolysis of alkoxides which are individual metal atoms bonded to the hydrocarbons. The alkoxides are mixed to produce the desired ratio of metal atoms in the final ceramic and then water is added to the mixture. The water hydrolyzes the individual alkoxide molecules into the chains which remain suspended in the solvent. In this way, metal oxide molecules are dissolved in solvents such as simple alcohols.

The sol gel is spun onto the substrate using a conventional spinning apparatus. The solvent evaporates during the spinning, leaving the surface of the substrate coated with metal organic chains. The substrate is then heated gradually to evaporate the remaining solvent. After the solvent has been evaporated, the coated substrate is heated further to break the hydrocarbon bonds. As a result, hydrogen, carbon, and oxygen are released, leaving a coating of metals and oxygen. The substrate is then raised to a temperature which sinters the amorphous layer into its ceramic form. For PLZT, the hydrocarbons evaporate below 400 degrees Centigrade.

After deposition, the film is sintered to form the final ceramic layer. The temperature at which the film is sintered may also be used to control the properties of the film. For example, if a 98% lead, 2% lanthanum, 65% zirconium and 35% titanium composition is used, the final film will be a ferroelectric if heated to 550 degrees Centigrade. However, if the sintering takes place between 400 and 500 degrees centigrade, a pyrochlore structure will be formed. Such a structure is paraelectric as opposed to the perovskite structure obtained at the higher temperature which is ferroelectric.

For the purposes of the present discussion, it will be assumed that modulation region 15 is a paraelectric structure. The use of ferroelectric structures will be discussed in more detail below.

For PLZT materials, the difference in the indices of refraction between the two states of polarization is approximately equal to 0.002. PLZT materials are preferred because this is among the highest differences in index of refraction that can be obtained with a material capable of withstanding the temperatures used in conventional semiconductor processing. It will be apparent to those skilled in the art that it would be advantageous to be able to construct light switching devices on the same substrate as conventional integrated circuits.

Photoconductive region 20 is also preferably constructed from the same thin PLZT film. After deposition, photoconductive region 20 is differentiated from modulation region 15 by the introduction of ions that will cause it to become photoconductive when illuminated with light having a wavelength less than a predetermined critical wavelength. The ions in question can be introduced by ion implantation techniques or other conventional techniques such as diffusion. It should be noted that the process of ion implantation also reduces the dielectric constant of the PLZT film. It has been found that a difference in dielectric constant of a factor of 10 can be obtained by ion implantation.

In the absence of doping, PLZT materials become photoconductive when illuminated with light having a wavelength less than 0.35 microns. If photoconductive region 20 is doped with argon and nickel ions, this critical wavelength can be increased to approximately 0.57 microns. If iron ions are used, the wavelength is increased to approximately 0.7 microns. Finally, if neodymium or silicon ions are used the wavelength can be extended to approximately 1 micron. The above ions can be ion implanted at energies between 50 Kev and 100 Kev if photoconductive region 20 is approximately 0.5 microns in thickness. The final concentration is preferably about $10^{18}$ ions/cm$^3$.

The critical wavelength is preferably longer than that of the light input through input light pipe 18. Hence, neodymium and silicon ions are preferred. This allows light switching devices according to the present invention to be utilized for switching light for the purposes of controlling other light switching devices in complex optical systems.

The angle at which input light pipe 12 introduces light into modulation region 15 depends on the difference of index of refraction of modulation region 15 and region 13 when photoconductive region 20 is exposed to light. In the preferred embodiment of the present invention, this angle is sufficient to cause the light from input light pipe 12 to be totally internally reflected from interface 31. The reflected light exits light switching device 10 through output light pipe 16. As noted above, the preferred embodiment of the present invention utilizes PLZT materials in which a difference in index of refraction of about 0.002 may be generated. For these materials, the angle of incidence of light on interface 31 must be at least 88.5° with respect to the normal to the surface of interface 31.

However, it will be apparent to those skilled in the art that total internal reflection is not always required. For example, in those applications in which only the light exiting through output light pipe 16 is utilized, partial reflection from interface 31 is sufficient.

As noted above, the preferred material for constructing the modulation region and photoconductive region is PLZT. This material has the highest difference in index of refraction of any non-organic material. Since it is important that both the modulation region and photoconductive region be able to withstand the temperatures inherent in semiconductor processing, organic materials are not suitable. In addition, by adjusting the composition of the PLZT materials, modulation regions which are either paraelectric or ferroelectric may be obtained. In general, if a fast switching device is required, a paraelectric material is preferred since it returns to the same state of polarization after the electric field is removed.

However, there are applications in which it would be advantageous to change the index of refraction of the modulation region in such a way as to guarantee that the index of refraction will remain at the new value even if power is lost. If the modulation region is ferroelectric, then the index of refraction may be changed in such a manner. Unfortunately, to change the index of refraction back to the original value, the potential V must be varied in a manner dictated by the hysteresis curve which characterizes the material. Hence, the light switching device cannot be switched back in a time which is independent of the speed with which an electrical potential can be switched.

The above embodiments of the present invention have utilized an interface which is planar for the reflection of the light received by the input light pipe. However, it will be apparent to those skilled in the art that interfaces having different geometric configurations are also useful. For example, a concave shaped interface could be used to focus the incoming light into the output light pipe.

There has been described herein a light switching device. Various modifications to the present invention will become apparent to those skilled in the art from the foregoing description and accompanying drawings. Accordingly, the present invention is to be limited solely by the scope of the following claims.

What is claimed is:

1. An optically activated light switching device comprising:
    a transparent region having a predefined boundary;
    a modulation region comprising a portion of said transparent region, said modulation region having first and second boundaries, said second boundary being coincident with said boundary of said transparent region, said modulation region having first and second indices of refraction, said first index of refraction being substantially equal to that of said transparent region, the index of refraction of said modulation region being switched between said first and second indices by the generation of an electric field in said modulation region;
    input port means for receiving light and directing said light toward said first boundary at a predetermined angle with respect to said first boundary, at least a portion of said light being reflected from said first boundary when said modulation region has said second index of refraction;
    first output port means positioned so as to receive light received by said input port means when said modulation region has said first index of refraction;
    control port means for receiving a light signal having a wavelength less than a predetermined wavelength; and
    field generating means connected to said control port means for generating a potential difference between said first and second boundaries of said modulation region in response to said control port means receiving said light signal, thereby causing the said index of refraction of said modulation region to change from said first index of refraction to said second index of refraction when said light signal is received by said control port means.

2. The light switching device of claim 1 wherein said predetermined wavelength is longer than the wavelength of the light received by said input means.

3. The light switching device of claim 1 wherein said modulation region comprises a ferroelectric material.

4. The light switching device of claim 3 wherein said ferroelectric material comprises a lead lanthanum zirconate titanate.

5. The light switching device of claim 1 wherein said modulation region comprises a paraelectric material.

6. The light switching device of claim 5 wherein said paraelectric material comprises a lead lanthanum zirconate titanate.

7. The light switching device of claim 1 wherein said field generating means comprises:
    a first electrode overlying said transparent region and having an edge overlying said first boundary;
    a photoconductive region connected to said control port means and having a boundary coincident with said second boundary of said modulation region, said photoconductive region being positioned so as to be illuminated by said light signal received by said control port means; and
    a second electrode in contact with said photoconductive region and spaced apart from said second boundary of said modulation region, wherein said photoconductive region conducts the potential on said second electrode to said second boundary when said photoconductive region is illuminated by said light signal.

8. The light switching device of claim 7 wherein said photoconductive region comprises a PLZT material doped with an element chosen from the group comprising silicon, iron, argon, and neodymium.

9. The light switching device of claim 7 wherein the dielectric constant of the material comprising said photoconductive region is less than the dielectric constant of the material comprising said modulation region.

10. The light switching device of claim 7 further comprising resistive means coupled to said first electrode and said photoconductive region.

11. The light switching device of claim 1 further comprising a second output port means positioned so as to receive light input through said input port means and reflected from said first boundary of said modulation region.

* * * * *